United States Patent [19]

Izumi

[11] 4,048,340
[45] Sept. 13, 1977

[54] KOJI MAKING METHOD
[76] Inventor: Masahiko Izumi, 8,26-ban, 5-chome, Hiikawa, Nish, Fukuoka, Japan
[21] Appl. No.: 702,605
[22] Filed: July 6, 1976
[30] Foreign Application Priority Data

| July 21, 1975 | Japan | 50-088408 |
| July 23, 1975 | Japan | 50-089176 |
| Feb. 27, 1976 | Japan | 51-020084 |
| Mar. 26, 1976 | Japan | 51-032493 |
| May 6, 1976 | Japan | 51-050944 |

[51] Int. Cl.² .......................... A23L 1/23; A23L 1/34
[52] U.S. Cl. ........................................ 426/46; 426/52
[58] Field of Search ............... 426/52, 46, 44, 618; 195/115, 128, 129, 142, 109

[56] References Cited
U.S. PATENT DOCUMENTS 3,647,484  3/1972  Yokotsuka et al. ............... 426/46
3,764,708  10/1973  Aonuma et al. ................. 426/46

*Primary Examiner*—Raymond N. Jones
*Assistant Examiner*—R. A. Yoncoskie
*Attorney, Agent, or Firm*—Browdy and Neimark

[57] ABSTRACT

In a closed type Koji making method, gas is circulated by ventilation through a system comprising an oxygen inlet, a fan, various kinds of cyclones and a Koji making chamber. Aqueous vapor or steam is blown directly into the ventilation gas and its temperature and humidity are always maintained constant. According to the Koji making steps, temperature and humidity in the Koji making chamber are adjusted to an optimum value by opening and closing a by-pass line to effect the Koji making. Until germination of Koji-mould occurs, the ventilation gas is maintained substantially free of oxygen and the density of oxygen after the germination should be maintained at a necessary minimum value.

7 Claims, 5 Drawing Figures

KOJI MAKING METHOD

FIELD OF THE INVENTION

This invention relates to a closed ventilation type Koji making method and more particularly to a quite novel, effective Koji making method in which the adjustment of temperature and humidity of ventilation gas is carried out by direct blowing of aqueous vapor in to the ventilation gas and opening and closing operation of the by-pass line, which step is completely different from the prior art method.

BACKGROUND OF THE INVENTION

Heretofore, in the production of Koji, steam cooked materials such as rice, wheat, cereals and the like are inoculated with koji-mold and charged in a Koji-tray and cultured at about 30° C, wherein inoculation is generally carried out while the raw material is warm. The temperature thereof is reduced to 26° C during a period of 2 hours after the mori-operation thus preventing entry of infectious microbes therein owing to the lower temperature and promoting the germination. With a lapse of time of about 18 hours therefrom, the temperature of the material rises to about 30° C owing to the respiration heat, and therefore a first treatment-by-hand is carried out to put fresh air therein. Owing to the treatment-by-hand, the temperature of the material lowers to about 27° C, however after a period of approximately 25 hours the temperature again rises to approximately 30° C as a result of heat generation. At this point, a second treatment-by-hand is carried out to attain sufficient cooling and sufficient supply of air and thus after approximately 50 hours the product of Koji is discharged. Such a prior art method has been thought ideal. As is apparent from the above operation, it is an absolutely necessary condition in the production of Koji to suppress propagation of infectious microbes and to control temperature, humidity and supply of oxygen.

In order to meet such a condition, Koji making systems in which the entire system is arranged in a closed type system have been known, however in these known systems, adjustment of temperature and humidity of the Koji making chamber is carried out by causing the used gas to pass a warm water shower and thereafter again be supplied to the Koji making chamber. However, this method has the following significant drawbacks. Namely, first, the circulation gas in the system is subjected to heat exchanging with warm water for resue thereof, and as a result of the use of such warm water the droplets contained in the gas become very large, so that when using a supersaturation humidity the droplets are undesirably applied to the Koji. Secondly, the used warm water is thrown away as waste water or recirculated to use; however, in the former case its treatment is not easy and in the latter case the sterilization is not sufficient, so that the warm water provides a propagation field for infectious microbes. Thirdly, the gas after passing through the warm water shower contains an excess amount of moisture since droplets are large, very wet gas is produced, which is a decisive drawback.

Moreover, in these known systems, temperature adjusting systems of the Koji making chamber are all arranged in such a manner that gas feeding in to the chamber is directly fed into the Koji making chamber as it is from the beginning subjected to controlling of temperature and humidity, wind volume, and wind flow rate. Accordingly, the following drawbacks are inevitable. Namely, in the course of arriving at an inlet of the Koji making chamber from a gas generating source, there are losses of temperature, wind flow rate and wind volume owing to passage through cyclones for dust removal, addition of temperature and humidity, and in addition to such energy losses, further difficulties are such that, in order to control temperature, fans and cyclones should be finely regulated each time, and these regulations are usually inaccurate, and very difficult operations. Moreover, in order to meet the necessary conditions for the Koji making chamber, timelag is inevitably produced.

According to the prior art methods, in any case, ducts and fans etc. are inevitably applied with fine powder of raw material, dusts and water droplets, and these methods are always accompanied by danger of contamination from infectious microbes, particularly aerobic microbes. Once the system is contaminated by infectious microbe, not only the relevant batch products must be thrown away, but also the sytem must be subjected to sterilization treatment, with the result of inevitablely large damage.

SUMMARY OF THE INVENTION

This invention seeks to overcome all the drawbacks of the prior art methods. As a result of thorough studies relating to concrete means for preventing contamination by infectious microbes, optimum means for controlling temperature and humidity of the entire system, while the source of gas used to help prevent contamination, feeding volume of oxygen and time of addition of oxygen have been devised.

An object of this invention is to provide a Koji making method wherein instead of a heat exchanging system by warm water shower, steam is directly blown in the system, and, with the cooperation of cyclones, temperature and humidity are simultaneously adjusted without adjusting only temperature as in the above described systems.

Another object of this invention is to provide a Koji making method wherein ventilation gas itself is always maintained constant in its temperature and humidity condition; however, the temperature and humidity of the ventilation gas can be controlled easily, rapidly and correctly by changing ventilation volume of a so-called bypass which connects a pipe that further connects a gas generating source, before the inlet to the Koji making chamber, to a discharge gas pipe.

A further object of this invention is to provide a Koji making method wherein inert gas is used and the volume of oxygen is limited to as small a amount as possible, and particularly during a period before and up until germination of Koji-mould, when oxygen is completely cut off.

A further object of this invention is to provide a Koji making method which can use waste gas such as combustion gas, flue gas, etc., effectively.

A further object of this invention is to provide a Koji making method which is free of contamination of infectious microbes, has ready means for easy control of temperature and humidity, and can produce various kinds of high grade Koji in a short period effectively.

A further object of this invention is to provide a Koji making method which can carry out steps from steam cooking of Koji making raw material to Koji making by means of one apparatus consistently.

Namely, according to this invention such a Koji making method is provided that is characterized in that in a closed Koji making system provided with a Koji making chamber having a ventilation port and a discharge port interconnected by pipes, (A) until germination of the Koji-mould the interior of the system is caused to have substantially an inert gas atmosphere and is maintained at 32°-38° C, preferably 35°-37° C, as inert gas, waste gas such as combustion gas, etc., may be used; (B) after germination of the Koji-mould the oxygen concentration in the interior of the system is maintained at a volume necessary for growth of the Koji-mould; (C) during the Koji making, ventilation to the Koji making chamber is effected under constant velocity, volume of wind, temperature and humidity by direct blowing treatment of aqueous vapor and operations of fan and cyclone, and at the same time the ventilation system and exhaust system are connected directly and in parallel with the Koji making chamber, and temperature and humidity in the Koji chamber is adjusted by adjusting ventilation volume in the connection while Koji making is proceeding.

This invention includes a method for practically and effectively carrying out the Koji making method which consistently attains various treatments such as supply of raw material, steam cooking, Koji making, agitation, discharge of product of Koji and sterilization of the Koji making system, and apparatus for such method, particularly a novel steam cooking Koji making chamber.

This invention has features described above, and its significant characteristics lie in that the Koji making step is set up during the borderline of the germination period with the result that supply volumes of oxygen before and after this period are correctly ascertained. In addition a by-pass mechanism is newly adopted as a temperature and humidity adjusting mechanism for ventilation gas, and a system which can freely utilize waste gas such as flue gas and the like as an inert gas is newly developed. Accordingly, remarkable effects as described below can be obtained. Namely, when virgin steam is directly blown in to the system, supersaturated aqueous vapor of a humidity of 105 – 110% is produced, and, when such vapor or steam transforms into water droplets, very small droplets are formed and therefore the resultant gas containing such droplets is in dry state in comparision with gas obtained by warm water shower treatment which is superwet and sticky, so that this resultant gas has an appropriate humidity for the Koji making. Moreover, in the prior art method which uses heat exchanging by warm water shower, liquid particles entrained in the gas are large in size, and the gas transporting apparatus is dotted with water droplets thereby providing propagation positions for infectious microbes. Furthermore, waste water of the warm water shower is finally thrown away; however, since in the waste water here is dissolved a large amount of volatile constituent produced by Koji-mould, thereby having considerable B.O.D. and offensive smell, there is danger of causing public injury if such waste water is directly discharged into rivers. This invention has no such drawback.

Temperature and humidity adjustments of prior art ventilation closed type Koji making systems has been carried out by changing rotational velocity of the fan or changing velocity and volume of the supply steam. However, if rotational velocity of the fan is changed to a lower velocity, infectious micrones and dust may be applied to the blades of the fan resulting in difficult problems. Also there is a drawback in that fine adjustment of temperature and humidity by changing the amount of vapor supplied is difficult.

According to this invention, a by-pass is constructed by directly connecting the ventilation pipe and exhaust pipe in parallel with the Koji making chamber. A damper, etc., is arranged in the by-pass to change the amount of ventilation, so that temperature and humidity can be finely adjusted while rotational velocity of the fan and the amount of steam supplied are maintained constant.

That is to say, this invention is characterized in that steam is directly blown in the ventilation closed type Koji making system to adjust the temperature and humidity of circulating gas. A by-pass is provided between the ventilation and exhaust pipes of the Koji making chamber, and even if the ventilation fan is always driven at a certain velocity, temperature and humidity of circulating gas in the system can be freely adjusted by the simple operation of adjusting the amount of ventilation by the by-pass. In this method, owning to the use of steam, cyclone and by-pass, fundamentally different from the prior art warm water shower system, sterilization of exhaust gas is performed perfectly thereby preventing contamination of the system by infectious microbes.

Also, according to this invention, inert gas is used in circulation and the amount of oxygen used is limited to a necessary minimum. The result is that contamination by infectious mibcrobes is prevented. In addition, respiration of the mould bodies only, resulting in the waste of raw material carbohydrate as in the prior art method in which a large amount of air is supplied, is prevented. Thus, Koji product of lower grade having unbalanced enzymatic activity can never be produced. Moreover, according to this invention, the adjusting mechanism for temperature and humidity of ventilation gas is not only simplified, but also can immediately fit changes of temperature and humidity in the Koji making chamber. Higher accuracy and automatic operation can be easily obtained. Also, waste gas such as flue gas is effectively used as an inert gas source, so that this invention is useful in the prevention of public injury. Since waste gas having some energy left is utilized, an additional advantage is energy economy.

According to this invention, owing to the lack of use or lower use of oxygen and also the possibility of fine regulation of temperature, humidity and amount of oxygen, contamination by infectious microbe can be prevented, and thereby Koji of high quality can be produced. Various Kojis of different qualities for various applications such as Koji for miso as well as "Tukihaze" Koji and "Sohaze" Koji for sake can also be easily produced by variously controlling the above respective conditions. In addition, use of specially designed Koji making apparatus and a steam cooking Koji making chamber permits effective Koji making steps.

BRIEF DESCRIPTION OF THE DRAWINGS

A Koji making method according to this invention will be described with reference to the accompanying drawings. However, the following description is done only for simplification of understanding of this invention in relation to a preferred embodiment, and accordingly this invention should not be limited to the embodiment described herein, and covers all changes and modifications which do not constitute departures from the true spirit and scope of this invention.

In the drawings.

DESCRIPTION OF PREFERRED EMBODIMENTS

Figure 1:
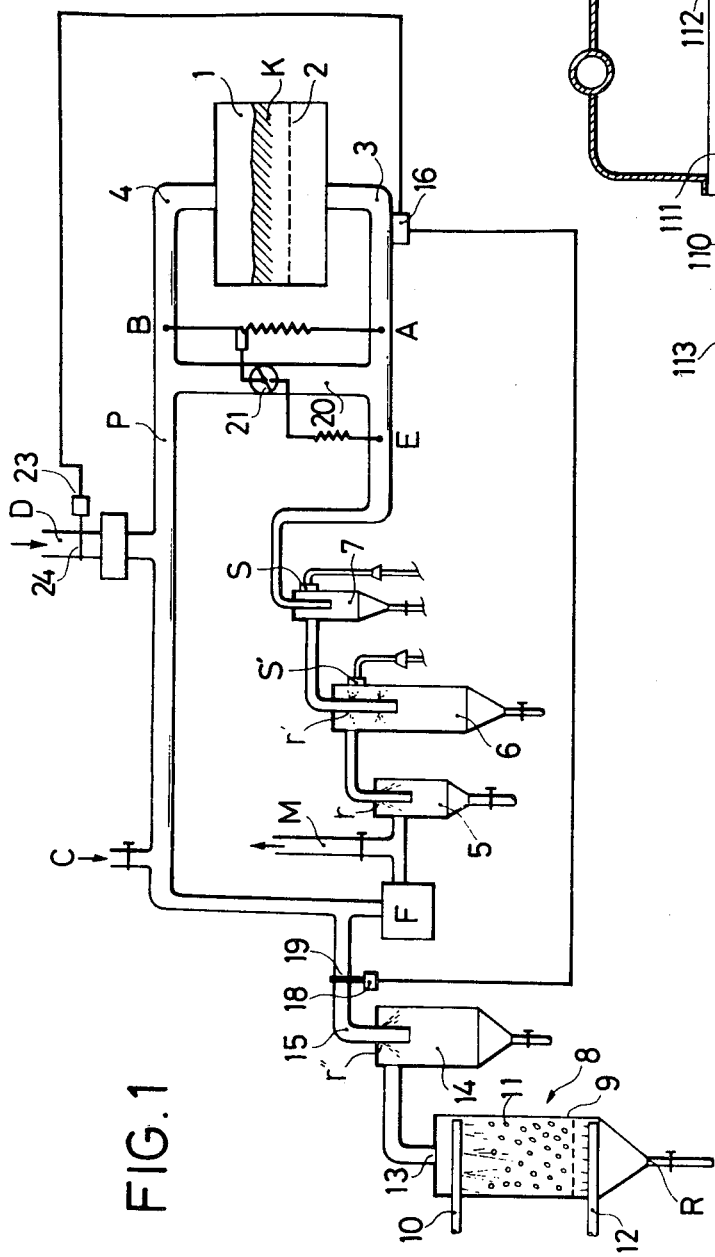
FIG. 1 is a diagramatic view of an embodiment of the apparatus for carrying out this invention.

Referring to FIG. 1, Koji making raw material K such as rice, wheat, soy bean, wheat bran, rice husk, sweet potato chips, cereals etc., is spread on shelf 2 at a uniform level in a Koji making chamber 1, and the upper portin and lower portion of the Koji making chamber 1 are provided with a ventilation pipe 3 and an exhaust pipe 4 respectively, and these pipes 3 and 4 are connected by means of a pipe P to constitute a closed type Koji making apparatus. Pipe P has an inert gas inlet C, through which inert gas is supplied into the pipe P. Until Koji-mould germinates, it is an essential condition to ventilate only inert gas according to this invention.

According to this invention, the amounts of oxygen before and after the germination period of Koji-mould are quite different from each other, and before the germination oxygen is wholly unnecessary. However, in this period, adequate temperature and humidity are necessary, so that in order to control these, inert gas quite free from oxygen is circulated by ventilation. Accordingly, there is no room for growth of infectious microbes, particularly aerobic microbes and thus the danger of contamination is removed. Inert gas in this invention means all gases which do not contain any oxygen and do not give any injurious effect to the growth of Koji-mould. As examples of said inert gases, helium, neon, argon, xenon, krypton and radon etc., and except for the above described inert gases of a narrow sense, nitrogen gas, carbon dioxide gas and mixed gas of these gases can be given. Moreover, except for these pure chemical gas products, gases including the above described gases, for example, combustion gas, flue gas and waste gas of boilers and the like and also sulfurous acid gas can be effectively utilized as the inert gas if poisonous substances have been removed. In case of the latter, effects of reuse of resources, reduction of public injury and effective utilization of waste heat are newly obtained.

The inert gas fed into the system through the inlet C is fed to a fan F and adjusted in wind velocity and wind volume and then fed to cyclones 5, 6 and 7. Between the fan F and the cyclone 5 a gas exhaust port M is provided so as to allow partial discharging of gas, if necessary. The cyclone 5 is used for removing comparatively large dusts, and such dusts are circulated inside the cyclone 5 while subjected to spray water with the result of increasing the weight of the dusts and thereby moving of the dusts downward along the inner wall of the cyclone and collecting them at the lower portion thereof. Next, the gas is fed to a cyclone 6 where it is subjected to a hot water shower from a shower r' so that fine dusts are caught and at the same time the gas is subjected to sterilization by steam from a steam supply port S' and thereafter fed to a cyclone 7. In the cyclone 7 virgin steam is fed therein from a steam supply port S so as to cause contact of the aqueous vapor with circulation gas. The steam thereby becomes supersaturated aqueous vapor of a humidity of 105 - 110%, and as a result, said aqueous vapor becomes a preferable condition for Koji making, namely its water droplets become very small in size, and at the same time the circulation gas is adjusted to an adequate temperature of 27° - 35° C.

According to the prior art method of adding humidity and temperature, large water droplets get into the pipe, and with a slight cooling said droplets change into rain and drop in the pipe resulting in lowering heat conductivity and providing a propagation source of infectious microbes and other bad influences; however, according to the present invention, as described above, special cyclones are used and the order of arrangement thereof are specified, so that drawbacks as above are never produced. In the present invention, the circulation inert gas is always applied with a constant temperature and humidity by means of steam in the above way.

Figure 2:
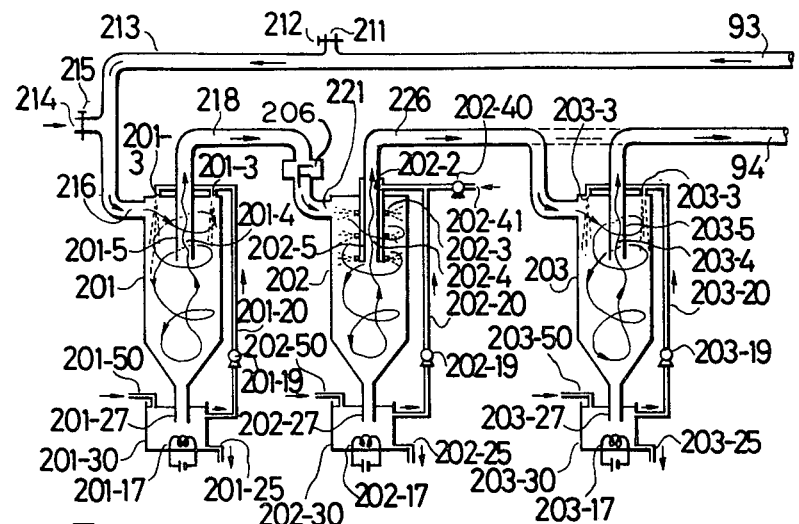
FIG. 2 is a diagramatic sectional view of an embodiment of the cyclones used for this invention.
Figure 3:
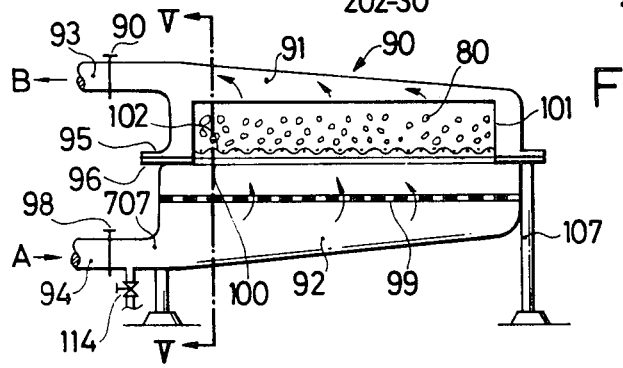
FIG. 3 is a sectional view of a steam cooking Koji making chamber.
Figure 4:
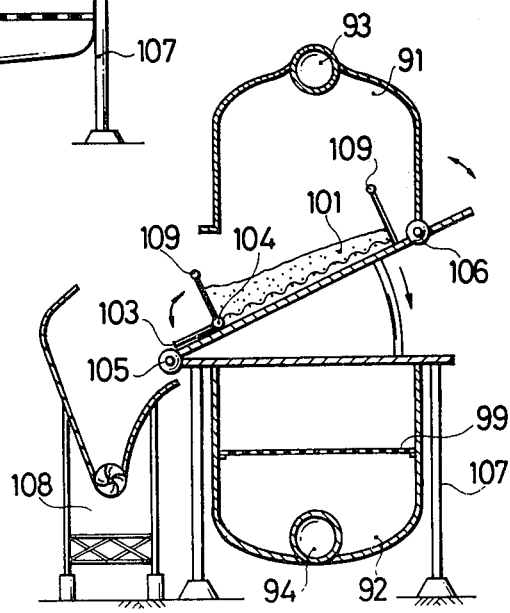
FIG. 4 is a section vertically taken on the line V—V of FIG. 3.

Next, operation and construction of the cyclones will be further detailed with reference to FIG. 2 showing a second embodiment of this invention. During the Koji making step, exhaust gas discharged from the Koji making chamber is fed to a first gas conditioning apparatus body 201 of cyclone type from a gas inlet 216 through a ventilation hole portion 93 and a duct 213. The duct 213 is provided with an exhaust outlet 211 for discharging the used dirty gas when necessary and an intake port 214 for fresh air respectively, and these are respectively provided with adjusting valves 212, 215. An air inlet 216 is arranged tangentially to the body cylinder, so that the working gas is gradually moved downward while swirling in the body as shown by an arrow in the drawing. On the other hand, water fed by a pump 201 - 19 is sprayed out from a water outlet 201 - 3 through a pipe 201 - 20, and flowed down while causing all the inner wall of the gas conditioning apparatus body to wet. The gas entered from the gas inlet 216 is directed downward with swirling motion, and when it strikes against the inner wall it is contacted with water flowing down along the inner wall and as a result infectious microbes and dusts become absorbed in the water. However, in this case substances of relatively large grain size can be absorbed, but smaller dusts of a grain size such as below 4 - 10μ can not be sufficiently absorbed by water and get out from the gas outlet 201 - 4 to the duct 218 with the gas. The gas which has been cleaned mostly and applied with proper moisture and temperature is positively fed into a second gas conditioning apparatus 202 by means of a blower 206. In this second gas conditioning apparatus, the working gas moves like the previous case. However, this second apparatus differs from the first gas conditioning apparatus in the fact that the former has a water supply means for completely removing fine dusts. Namely, water which is supplied from a water supply pipe 202 - 50 via the pump 202 - 19 and has a controlled temperature gets in a water cylinder 202 - 2 through a pipe 202 - 20 and then is sprayed toward the inner wall of the gas conditioning apparatus from a water sprayer port 202 - 3. The gas which is swirling down contacts with this sprayed water for a long time, and since the contact area between the both becomes large, the working gas and the sprayed water are sufficiently mixed and thereby fine infectious microbes, dusts and dirts are absorbed into the sprayed droplets resulting in increasing the weight of the droplets and according to the principle of cyclone moving down along the inner wall of the gas conditioning apparatus body as shown in the drawing and getting out from a circulation water outlet 202 - 27. The clean working gas thus treated and applied with sufficient temperature and humidity is fed from the lower portion upward, from the exhaust outlet 202 - 4 through a gas discharge pipe 202 - 5 and a duct 226, and after the end of the treatment in the cyclone 7 (FIG. 1) fed into a Koji substrate 80 through a Koji making chamber gas inlet.

The clean working gas passed through the duct 226 via the gas discharge pipe 202-5 is fed to a third gas conditioning apparatus 203 to remove excess moisture when necessary, whereby the moisture is removed as much as possible, and then the gas is passed through the gas discharge pipe 203 - 5 from the gas discharge port 203 - 4, and after subjected to the treatment by the cyclone 7 (FIG. 1), it may be fed to the Koji substrate 80 through the steam cooking Koji making gas inlet 207. The third gas conditioning apparatus 203 has the same mechanism as the first gas conditioning apparatus, and all the inner wall thereof is wetted by water sprayed out from the water outlet 203 - 3, and gas entering from the gas inlet is swirled downward, and when the gas strikes the inner wall it is contacted with the water thereby absorbing water droplets and small dusts therein.

The water used for the treatment of the gas in each gas conditioning apparatus is collected in the circulation tank through its outlets 201 - 27, 202 - 27 and 203 - 27, its temperature is adjusted by means of a temperature adjusting devices 201 - 17, 202 - 17 and 203 - 17, and then the water is reused in each gas conditioning apparatus. Lacking water is optionally supplied from water supply outlet pipes 201 - 50, 202 - 50 and 203 - 50. The numerous 202 - 25, 202 - 25 and 203 - 25 designate an outlet for discharging settled dirts and water.

In order to eliminate the already described drawbacks of the prior art system in which the gas itself which is fed into the Koji making chamber is respectively controlled in temperature and humidity, wind volume and wind velocity in accordance with respective steps of Koji making and fed directly in the Koji making chamber, according to the present invention temperature and humidity of the gas itself is not altered but maintained constant, and a by-pass 20 is formed by connecting the Koji making chamber inlet pipe and outlet pipe, and ventilation volume of the by-pass is adjusted by means of a ventilation volume adjusting means such as valve and damper etc. thereby regulating the ventilation volume to control temperature and humidity indirectly, the system of which developed by this invention is quite epoch-making and novel. Namely, in the present embodiment (FIG. 1), a by-pass pipe 20 is provided between the pipes 3 and 4, and a valve 21 is arranged in the by-pass pipe 20, and thus the ventilation volume fed into the Koji making chamber 1 is controlled by opening and closing of the valve and as a result of this, adjustment of temperature and humidity and an adjustment of oxygen concentration (the step after germination) in the Koji making chamber can be very easily performed. Moreover, temperature detecting devices are provided at points A and E in the pipe 3 and point B of the pipe 4, and according to detected valves of said devices, rotation of the valve 21 is controlled via solenoid and the like, thereby causing the gas in the pipe 3 to pass the by-pass partly so that the temperature can be controlled automatically.

Also, in the prior art Koji making, in the period until germination of the Koji-mould temperature is controlled to about 27° - 29° C, and the Koji making is performed for about ten hours while preventing generation of infectious microbes, and after germination, the Koji making is performed at a temperature of 35° - 38° C after "Kirikaeshi" operation. Such a low temperature Koji making using a temperature of 27° -29° C during the period of germination is adopted to prevent a large amount of propagation of aerobic microbes so as not to hinder germination and growth of Koji-mould. If the Koji making is carried out at a higher temperature of 32° - 37° C under an aerobic condition, a large amount of aerobic infectious microbes will be grown.

However, in the present invention, the period of Koji making germination is held under a substantial inert gas atmosphere, so that aerobic microbes are is suppressed so as not to cause propagation thereof, and as a result, even if the condition is changed to minimum aerobic circumstances, since the Koji-mould has already started to cause germination and propagation thereof, the propagation of infectious microbes can be almost suppressed, and accordingly even if temperature is raised to 32° - 37° C, propagation of infectious microbes does not occur. Also the germination period can be greatly shortened by raising temperature.

Until germination of Koji-mould takes place, according to above described manner, gas free of oxygen is circulated and only temperature and humidity are maintained at respective proper values. However, after the germination has occured, it is an indispensable condition to supply oxygen in circulation manner. In this case, the desired object can not be attained if gas containing a large amount of oxygen such as air is used.

Namely, another significant feature of this invention lies in that the necessary amount of oxygen after germination is necessaryly a minimum and a concrete system therefor has been developed. If gas containing a large amount of oxygen such as air is ventilated, not only infectious microbes are propagated, but also the grade of quality of product of Koji itself is lowered, for example, saccharification power of koji etc. will be lowered, so that volume of oxygen must be as little as possible. The volume of oxygen has been found suitable as a result of studies that for 20 hours after germination of Koji it is 5 - 16%, preferably about 12 - 15%, and after that it is 2 - 8% preferably about 5%.

In order to maintain the amount of oxygen within this range in the system it is necessary to dilute oxygen containing gas, such as air, with inert gas. As inert gas used for this purpose, there is, as described above, pure inert gases or a mixture of these gases and, in addition to these, waste gas such as combustion gas has also been found to be useful, and this point also constitutes an important feature of this invention.

Since various kinds of waste gases have proper temperature and humidity, it is a very large advantage in energy economy to use such gases for Koji making. Heretofore, carbon dioxide gas in the form of waste gas has been discharged into the atmosphere thereby providing a source of public injury, which is however prevented by effective use of such waste gas according to a feature of this invention. Many kinds of injurious components are contained in these waste gases, so that their removal is indispensable, and in this respect, many experiments and studies have been repeated, with the result that the following system has been completed.

Namely, waste gas from a source of waste gas such as a boiler and the like is guided to a shower 8 provided outside the system separately from the circulation gas course to clean gas discharged from the flue of a boiler and the like. Usually, waste gas includes ash fine particles, carbon fine particles due to imperfect combustion and poisonous gas such as sulfurous acid gas, and therefore these must be removed prior to introduction into the cyclones 5, 6 and 7 by a previous water washing step. Generally, the shell body 9 of gas washer 8 is a cylinder or an angular cylinder, and in the interior thereof a filler material such as broken stones and balls of synthetic resin are included. On the other hand, washing water is fed from a washing water pipe 10 mounted on the upper side of the shell, and sprayed over the filler material 11 in the form of shower in the shell 9, and then discharged from the discharge port R. Also, the flue gas is fed from the pipe 12, and raised through the gap of the filler material 11 while washed by droping water sufficiently, resulting in that the poisonous gas and fine particles etc. in the flue gas are transferred into the washing water, so that only cleaned flue gas is fed out from the gas feed port 13. The gas fed out from the gas feed port 13 is dehydrated by a water separator 14 composed of cyclone and dusts caught by sprayed water from the shower r" and introduced into the pipe P at the upstream side near the fan F through the duct 15.

On ther other hand, in order to supply a necessary amount of oxygen in the system, an oxygen (or oxygen including gas such as air) intake port D is provided in the pipe, through which oxygen consumed during the Koji making step is supplied.

As described above, the flue gas containing a necessary amount of oxygen is subjected to adjustment of temperature and humidity by means of the fan F and the cyclones 5, 6 and 7, and then introduced in the Koji making chamber. Oxygen is consumed in the course of the Koji making step, and therefore it is necessary to supply that part newly. For this purpose, in this embodiment an oxygen gas measuring device 16 is mounted at a suitable point in the pipe 3. Namely, flue gas which is used as inert gas is composed of carbon dioxide gas and nitrogen gas after consumption of oxygen, and accordingly such a system has been adopted that the concentration of oxygen is controlled by knowing the concentration of oxygen gas. As an oxygen gas measuring device, an oxygen gas measuring device on the market generally used may be suitably used, and a detected value in the measuring device is fed to a controlling apparatus 18. Control is usually performed in a cascade control system, and a detected value is converted to oil pressure and thereby a valve 19 mounted on the way of the duct is operated to open and close. In this case, when the concentration of oxygen gas in the pipe 3 is lower than a set value, the valve 19 is closed, and when it becomes higher, said valve is opened. At the same time, a measured value from the oxygen gas measuring apparatus 16 is transmitted to a control apparatus 23, and as a result of this, the valve 24 is open or closed to control taking-in volume of air (or oxygen). Accordingly, combustion gas can dilute the oxygen concentration of air and control the oxygen concentration of supply gas. Adjustment of temperature and humidity of this gas is performed by using the by-pass 20 and the valve 21 as described above.

In the case a gas other than carbon dioxide gas is used as the inert gas, introduction of the inert gas and supply of oxygen (or gas including oxygen) are controlled by using the oxygen detecting apparatus in the same manner. In the case a gas other than combustion gas is used as the inert gas, a control apparatus 18 and a valve 19 are provided in the inert gas supply port C, and these are connected with a measuring apparatus 16 and a valve 19 is caused to open or close (not shown). As inert gas for the circulating ventilation in the system before germination, except for using pure inert gas as described above, combustion gas used in circulation after germination can be used as a matter of course. In this case, the inert gas supply port C is unnecessary of course.

Moreover, according to this invention, it is also possible to supply a large amount of high temperature steam from a steam supply port S or S' before the beginning of Koji making to effect sterilization of all the Koji making system inclusive of the Koji making chamber by filling steam therein.

Also, the present invention includes such method and apparatus therefor that in a series of steps from supply of Koji making raw material to taking-out of Koji product and cleaning and sterilization of Koji making system the above described Koji making method is adopted thereby consistently producing Koji on a factory scale practically. Namely, this method is such a one comprising putting steam cooking raw material rice in a closed circulation gas line, supplying steam thereto to effect steam cooking the rice, and after the end of the steam cooking, stopping the supply of steam and causing the interior gas to circulate with the circulation gas line closed, subjecting the closed gas line to sudden reduction of pressure and rapid cooling, then performing inoculation of movid starter, again closing the gas line, effecting ventilation in the circulation gas line, and stirring and crushing the raw material rice sometimes and thereby making Koji. An apparatus for carrying out this method is one such that a steam cooking Koji making chamber of approximately cuboidal shape with respective corners cut out comprises a steam cooking Koji making upper chamber and a steam cooking Koji making cooking lower chamber, the upper chamber being provided with a container having a gas permeable body stretched at the bottom thereof, the upper chamber also being provided with an upper ventilation port at the upper portion thereof, the forward end edge portion of the frame being pivotally connected to the forward end edge portion of the lower chamber. On the other hand, the rearward end edge portion of the frame is removably pivotally connected to the rearward end edge portion of the upper chamber, the lower chamber is provided with a lower ventilation port at the lower portion thereof and the upper ventilation port of the upper chamber and the upper gas inlet of the first gas conditioning apparatus are connected by a duct, the lower ventilation port of the lower chamber and the upper gas discharging port of the second gas conditioning apparatus are connected by means of a duct and an air discharging pipe, and the upper gas discharging port of the first gas conditioning apparatus is connected to the upper gas inlet of the second gas conditioning apparatus via a blower by means of a gas discharge pipe and a duct, and the first and second gas conditioning apparatuses are of cyclone form and have each a circulation water taking-out port at the lower portion thereof, and under that portion each has a circulation water tank, and also the first gas conditioning apparatus has a water inlet at the upper portion thereof so as to cause water to flow down over the inner wall face thereof, and the second gas conditioning apparatus is provided with a steam inlet and also a water cylinder having a number of spray nozzles arranged about the periphery of the air discharge pipe at the air outlet so as to spray water toward the inner wall of the gas conditioning apparatus body, and these water outlet and water cylinder are respectively connected to the circulation water tanks arranged at the lower portions thereof by means of pipes via pumps.

Next, the steam cooking, rapid cooling and Koji making according to this invention will be described with reference to the accompanying drawings, particularly FIGS. 2 through 5 which show an embodiment of the invention on the basis of operation and function of the steam cooking Koji making chamber which constitutes one of the important characteristics, together with an explanation of construction of the cyclone type gas conditioning apparatus and machine for treatment by hand.

First, low pressure steam is fed to the second gas conditioning apparatus 202 from a steam taking-in pipe 202 - 41 via a blower 202 - 40 to inject the steam at a constant pressure from a steam injecting port 202 - 3. A blower 206 is then driven to fill the steam cooking Koji making chamber 90 with steam through the lower ventilation port 94. In this case the upper opening and closing portion 91 is maintained closed. The steam cooking is thus carried out and thereby sterilization and disinfection treatment in the chamber is automatically carried out. After the end of the team sterilization, the steam is discharged to make no-pressure and the chamber is closed. Next, the first gas conditioning apparatus 201 is operated, and water fed from a water supply pipe 201 - 50 is sprayed out from a water outlet 201 - 3 via a pump 201 - 19, with the result that gas fed from a gas inlet 216 is cooled and dust caught and the gas is then fed into the second gas conditioning apparatus 202, where this time water is used instead of steam to carry out a further perfect dust catching operation, the water being fed from a water supply pipe 202 - 50. Thus cleaned cooled gas is introduced into the steam cooking Koji making chamber 90 from the lower ventilation port 94 to cool the interior thereof. In the case of attaining more perfect cleaning of the chamber 90, steam is introduced therein through the upper ventilation port 93 thereby carrying out the treatment like the above. The chamber 90 is free of angular corners therein and has a rounded shape as a whole in addition to having inclination, so that the cleaning operation can be performed effectively and perfectly.

After cooling, the pivotal connection 106 is detached and the steam cooking Koji making upper chamber 91 is pulled up, and raw material rice after completion of steeping is put in the container 101, and the upper chamber is lowered against the lower chamber 92 to close them together, and thereafter steam cooking is started.

The steam cooking is carried out by means of steam taken-in through a steam taking-in pipe 202–41. The steam put in the second gas conditioning apparatus 202 is cleared of water droplets and dusts, and introduced into the Koji making chamber 90 from the lower ventilation port 94 via a blower 206 to steam cook the raw material rice in the container 101. During this treatment, the closed circulation gas line is filled with the steam, and the steam is continually supplied and circulated to steam cook the rice.

After the end of the steam cooking, the supply of steam is stopped as the closed circulation gas line is held closed, and the blower 206 is driven to cause the gas in the closed circulation gas line to circulate positively. With the circulation of the gas, the interior steam becomes converted into water droplets resulting in rapid pressure reduction therein so that moisture in the steam cooked rice layer is evaporated and the steam cooked rice is rapidly cooled.

After the completion of cooling of the steam cooked rice, the interior of the chamber is gradually returned to atmospheric pressure and the upper chamber 91 is pulled up. However, in the case not only the steam cooked rice is necessary, the upper chamber 91 is held pivotally connected with the lower chamber 92 at the back and the containing 101 is inclined as it is so that the rice is received in a receiving container 108.

Figure 5:
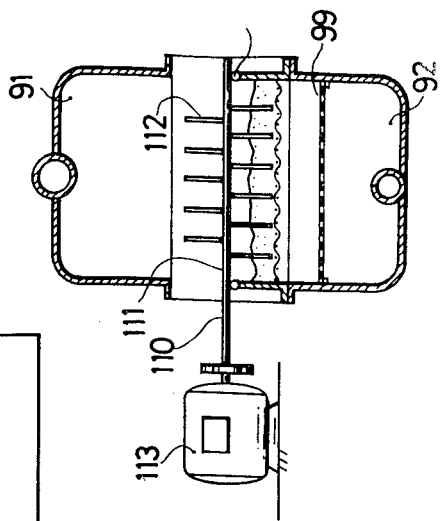
FIG. 5 is a view showing treatment by hand in Koji making.

Next, in the case of the Koji making, the steam cooked rice is left as it is and the upper chamber 91 is pulled up as shown in FIG. 5, and mold starter is inoculated by spreading mold starter on the rice and stirring these, and after lowering the upper chamber 91 onto the lower chamber 92 and closing them together. As described already, the Koji making is effected by using the first and second and, if necessary, third gas conditioning apparatuses, and also using the cyclone 7, and adjusting the amount of ventilation of the by-pass 20 thereby controlling temperature and humidity and adjusting the amount of oxygen.

On the Koji making step, the so-called treatment by hand, such as adjustment of moisture, discharge of carbon dioxide gas and supply of oxygen is carried out by levelling the raw material of Koji or stirring and breaking down thereof when necessary. For this purpose, the pivotal connection 106 is detached, and the steam cooking Koji making upper chamber 91 is moved up and an apparatus for treatment by hand 110 is mounted. Namely, an arm 111 provided with a number of stirring blades 112 is slidably mounted on rails 109 provided on the top of the front and rear walls of the containing 101. A motor 113 is then driven to rotate the stirring blades 112 thereby subjecting the Koji substrate to a slow treatment by hand, and after the end of the treatment by hand at the relevant portion, the apparatus for treatment by hand 110 is moved along the rails, and thus all the Koji substrate 80 is subjected to such a treatment by hand.

After the completion of the treatment by hand, the upper chamber 91 is lowered and the pivotal connection 106 is returned as before, and thereafter the gas conditioning apparatuses are operated and the Koji making is finished.

When the Koji making has been finished, the pivotal connection 106 is not detached and the upper chamber 91 is raised, and as a result the frame is inclined forwardly of the Koji making chamber 90 since the forward end portion of the frame 100 is pivotally connected to the lower chamber 92 at 105, so that the container 101 mounted on the frame 100 is also inclined forwardly, and accordingly the forward wall 103 of the Koji container 101 falls down forward and the Koji therein is automatically discharged out of the Koji making chamber 90, and the Koji is received by the receiving container 108 and the like.

After this operation has finished, the chamber 90 is cleaned, and then the forward wall 103 is returned as before, and the upper chamber 91 is lowered and then using the gas conditioning apparatuses the steam cooking treatment within the chamber 90 is carried out, and thus the steps as above described are again repeated.

As described above, according to this invention, steam cooking of raw material rice and its cooling thereafter can be automatically effected, and these can be successfully done in a very short time, and also perfect cleaning becomes possible, which has been thought inevitable because of handling of Koji in the form of solid substance, and also the Koji making apparatus, which has herefore been thought impossible to adopt to flow working and automatic operation, can operate very simply in putting-in and out of Koji because the Koji making chamber is divided into the upper and lower chambers and a quite novel construction is adopted at the connecting portion of the upper and lower chambers, and thereby the treatment by hand of Koji can be easily mechanized and automated.

What is claimed is:

1. In a Koji making method, in which ventilation gas is circulated through materials inoculated with Koji mould in a closed system including a ventilation line, a Koji making chamber and an exhaust line, the improvement comprising:
    directly blowing heated aqueous vapor into the ventilation gas to avoid infectious microbes in the gas and to control the temperature and humidity of the gas.

2. A method in accordance with claim 1 wherein said ventilation gas is an inert gas to which oxygen in an amount to promote fermentation is added.

3. A method in accordance with claim 1, wherein the closed system includes a by-pass ventilation line connecting the ventilation line and the exhaust line in parallel with the Koji making chamber, further including the steps of:
    removing dust and microbes from the ventilation gas by passing the gas through a cyclone separator; and
    controlling the relative amounts of ventilation gas passing through said ventilation line and said by-pass ventilation line, thereby controlling the amount of ventilation in the Koji making chamber.

4. A method in accordance with claim 2, wherein during the period prior to germination of Koji-mould in the beginning of Koji making, said inert gas is sustantially free of oxygen.

5. A method in accordance with claim 4 wherein during said period prior to germination the temperature in the Koji making chamber is maintained at 32° – 38° C.

6. A method in accordance with claim 2 wherein said inert gas is combustion gas from a combustion apparatus from which dust and poisonous gas has been removed.

7. A process for making Koji using an apparatus comprising a Koji making chamber, a ventilation line leading to said chamber, removal means in said ventilation line for removing dust and infectious microbes from the gas passing through said ventilation line, an exhaust line leading from said chamber and connecting with said ventilation line upstream of said separation means, by-pass means connecting the ventilation line and the exhaust line in parallel with said chamber, control means for controlling the amount of ventilation gas passing through said by-pass means, means for adding ventilation gas, means for venting ventilation gas, means for adding oxygen containing gas, means for adding heated aqueous vapor to the ventilation gas, and means for circulating the ventilation gas through the system, comprising:
    adding Koji making starting materials to said chamber;
    causing ventilation gas which is an inert as substantially free of oxygen to circulate through the system, adding sufficient heated aqueous vapor to heat the ventilation gas for avoidance of infectious microbes and maintain the temperature thereof at 32–38° C, and controlling said control means to maintain the germination temperature, humidity and flow rate in said chamber, until germination of the Koji-mould; and
    after germination of the Koji-mould continuing said steps of causing circulation and adding heated aqueous vapor, adding sufficient oxygen containing gas to said ventilation gas to maintain an oxygen concentration necessary for growth in the system and controlling said control means to maintain the growth temperature, humidity and flow rate in said chamber, until the Koji is completed.

* * * * *